May 30, 1972    R. S. NELSON    3,666,389
EXTRUSION APPARATUS FOR MAKING CONDUIT PIPE
Filed Nov. 24, 1969    2 Sheets-Sheet 1
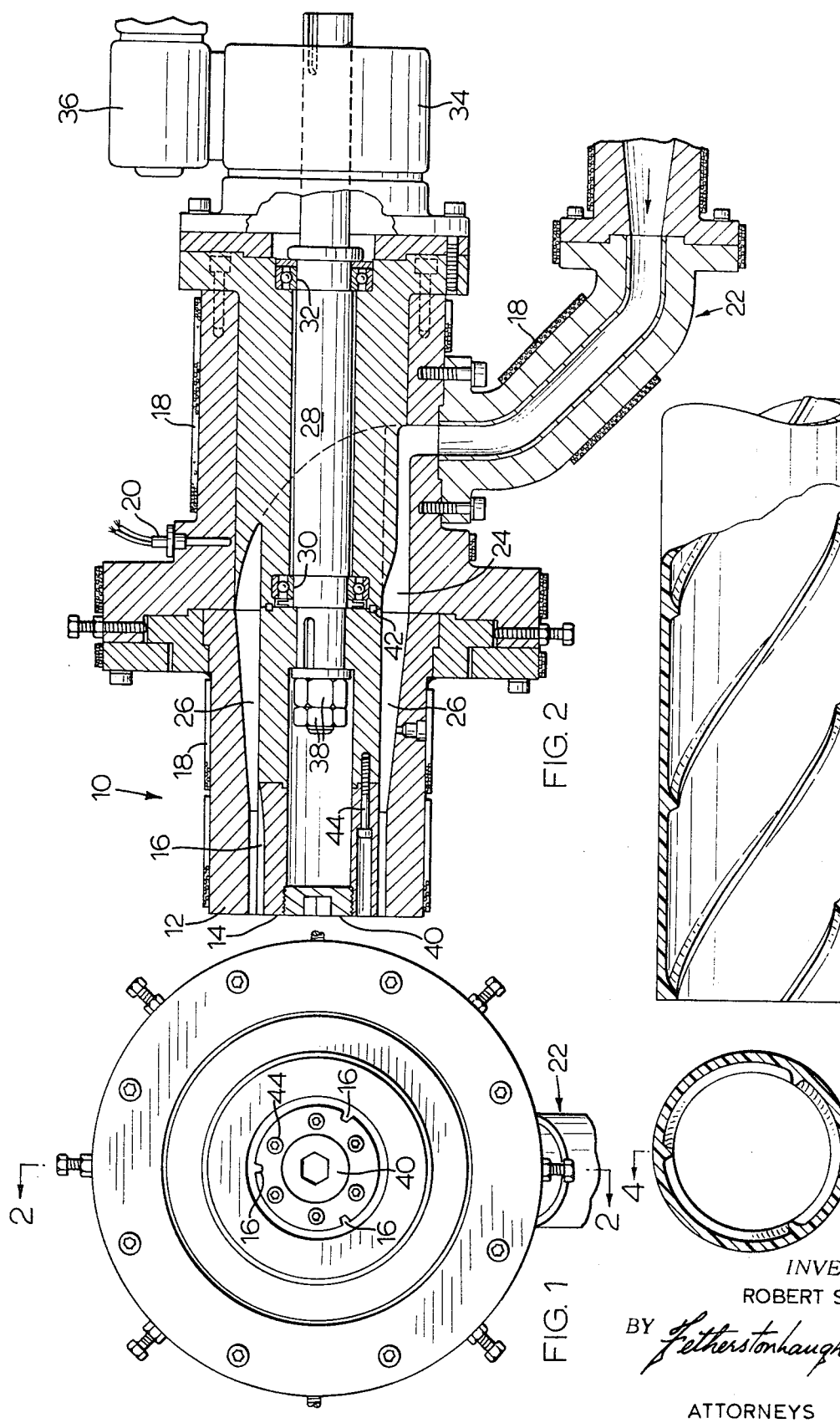
INVENTOR.
ROBERT S. NELSON
BY Fetherstonhaugh & Co.
ATTORNEYS

United States Patent Office 3,666,389
Patented May 30, 1972

3,666,389
EXTRUSION APPARATUS FOR MAKING CONDUIT PIPE
Robert S. Nelson, Islington, Ontario, Canada, assignor to Dominion Gasket & Manufacturing Co. Limited, Toronto, Ontario, Canada
Filed Nov. 24, 1969, Ser. No. 879,387
Int. Cl. B29d 23/04
U.S. Cl. 425—324
2 Claims

ABSTRACT OF THE DISCLOSURE

This disclosure relates to a machine for extruding pipe with an internal helical rib that has an extruding head with an annular extruding opening defined in part by a rotating core. The core is formed with a groove so that as plastic is forced through the head, the internal surface is formed with a helical rib due to the action of the rotating groove.

---

This invention relates to the manufacture of plastic pipe and is particularly concerned with plastic pipe intended for use in "solids" pipe lines and to a method of making it.

The term "solids" as used in this specification refers to materials which can be transported through pipe lines as slurries. The concept of transporting solids in this way has been known for some time but has only recently been reduced to practice. During the development of the technology involved, one of the problems encountered was the tendency of the solids to settle out, particularly in those portions of the pipe line where the velocity of the slurry is reduced as at bends and the like. It has been found that the tendency of the solids to settle from the slurry can be reduced by causing the slurry to move through the line in a spiral path. This has been accomplished in the past by attaching a spiral ridge to the inside surface of the pipe. The only known method for doing this has been to form a separate plastic spiral spring and allowing it to expand within the pipe so that it is held against the inside surface of the pipe by friction. Thus, the slurry takes a rotational path as well as a linear path as it moves through the pipe line, and when the linear velocity for producing spiral ridged pipe, namely, the previously is reduced, the imposed rotational motion maintains the total velocity of the slurry sufficiently high to prevent settling.

While the use of lines having spiral ridges on the inside surface of the pipe is known to reduce settling, only a limited number of such pipe lines have been installed to date in view of their relatively high cost as compared to normal lines having smooth inside surfaces. The high cost of the pipe is due to the inefficient but only known method for producing spiral ridged pipe, namely, the previously mentioned laborious forming of a separate spiral spring and attaching same to the inside surface of a normal smooth surfaced pipe. Even when carried out as an automatic process, this technique is a time-consuming and expensive process.

It is, therefore, the chief object of this invention to provide a method and apparatus for producing plastic pipe having one or more integrally formed spiral ridges on its inside surface at considerably less cost than has heretofore been possible.

The above and further objects of the invention will be understood from the following description of a preferred embodiment of the invention as read in conjunction with the accompanying drawings.

In the drawings:

FIG. 1 is an elevational view of the forward end of an extrusion machine head in accordance with this preferred embodiment of the invention;

FIG. 2 is a vertical cross-sectional view taken along the line 2—2 of FIG. 1;

FIG. 3 is a front elevation view of a piece of plastic pipe produced by the machine of FIGS. 1 and 2;

FIG. 4 is a vertical cross-sectional view taken along the line 4—4 of FIG. 3.

Figure 5:
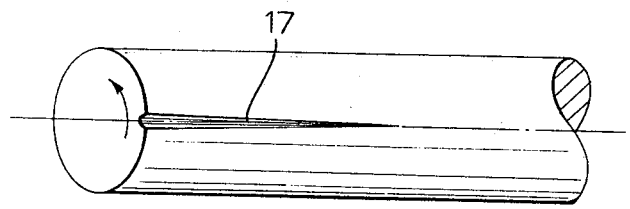
FIGS. 5 to 8 inclusive are side elevation views of alternative core pins used in the apparatus shown in FIGS 1 and 2.

The apparatus shown in FIGS. 1 and 2 is an extrusion head of an extrusion machine for the continuous production of plastic pipe. As is well known to those familiar with continuous extrusion equipment, the illustrated extrusion head would normally be used in association with cooling and finishing devices which receive the pipe extruded from the head and smooth its surfaces and set the plastic of which it is composed. The finishing and cooling devices used with the illustrated apparatus do not differ substantially from similar devices used in the production of normal plastic pipe and are not described in detail herein.

Referring now to FIG. 2, the illustrated extrusion head 10 essentially consists of an outer die 12 and an inner core 14. They are spaced from one another to define an annular passageway through which the liquid plastic is forced and from which it emerges in the form of a tube. As thus very broadly described, the extrusion machine of the invention is similar to known machines that have been used for many years for the production of tubing or pipe by continuous extrusion.

In accordance with the present invention, however, the inner core 14 is rotatable and is provided with at least one longitudinally extending groove 16 on its outer surface so that as the core is rotated, a spiral ridge is formed on the inside surface of the extruded pipe. In the illustrated embodiment, there are three grooves 16 so that three separate and distinct spiral ridges are formed on the inside of the pipe. The extrusion head of the invention is made of the normal materials used in such apparatuses, primarily steel. It is also provided with the usual resistance heating coils 18 and a thermostat 20 for keeping the plastic flowing through the head in the fluid state. The fluid plastic is introduced into the head through conduit 22 and first enters an annular space 24 within the non-rotatable component of the head. From this space, the plastic flows into the annular passageway 26 surrounding the rotatable core 14.

To provide for rotation of the core 14, it is mounted on the outer end of a rotatable shaft 28 which is mounted in a pair of spaced bearing assemblies 30 and 32. The other end of shaft 28 is fixed to the output shaft of a variable speed gear box 34 connected to a motor 36.

The connection between the rotatable core and shaft 28 is by means of a pair of nuts 38 which are accessible through the front end of the core which is closed off by a plug 40 during operation of the extrusion head. A ring seal 42 prevents the entry of fluid plastic into bearing 30 at the junction of the rotatable core and the fixed component of the head. Rotatable core 14 is formed of two parts which are held together by a plurality of bolts 44. This arrangement permits replacement of the forward end of the core should it be desired to replace the illustrated forward part having three ridge producing grooves 16 by another forward part having more or less grooves. Thus, the combination of the replaceable feature of the ridge producing part of the rotatable core and means for varying the speed of rotation of the core permits the production of any number of spiral ridges of any desired pitch.

Heretofore reference has been made to the production of plastic pipe, but it should be understood that the extrusion head of the invention is adapted to the production of pipe from other elastomeric materials of which pipe and tubing are made, including, for example, rubber. In the normal course, however, the extrusion head of the invention would be used in the production of plastic pipe from the usual "workhorse" plastics, such as polyvinylchloride, polyethylene, polypropylene and acrylonitrilebutadiene styrene.

FIGS. 5 to 8 show several alternative core groove configurations. In FIG. 5 the groove 17 is substantially parallel to the longitudinal axis of the core and tapers from a relatively narrow inlet end to a somewhat wider outlet end. This taper is not essential but is preferable in some cases. Whether a tapered or straight groove is used in any one application depends on several factors, including the output speed of the machine, the pitch to diameter ratio, the relationship between the rotational speed of the core pin and the linear speed of the material, the diameter of the pipe, the wall thickness of the pipe and the nature of the material being extruded.

Figure 6:
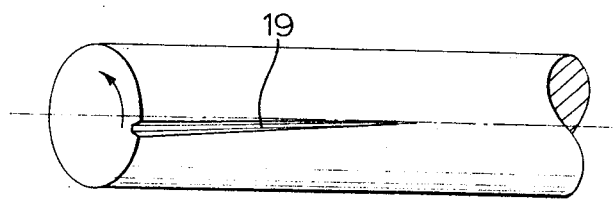
Figure 7:
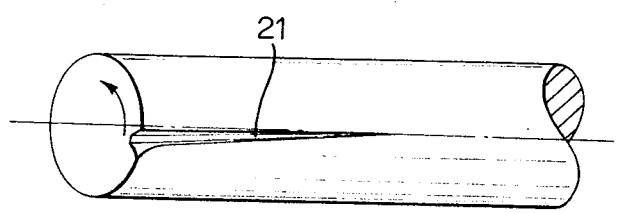
Figure 8:
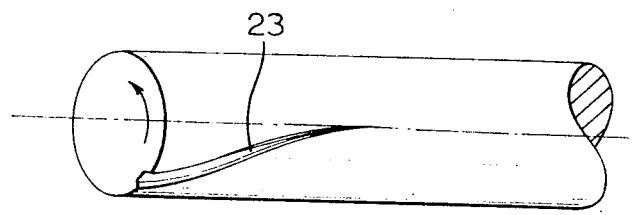

The above factors also have a bearing on the selection of the other groove configurations shown in FIGS. 6 to 8. In all cases the selection is made with one principal object in mind, namely, to reduce as much as possible any variation between the flow velocities of the wall material and the rib material. This is so because any variation in these velocities causes shear stresses in the material of the rib where it is contiguous with the inside surface of the pipe. These stresses cause distortion in the rib configuration and/or a weakness in the pipe wall.

Thus, it has been found that when extruding relatively small diameter pipe at a relatively slow speed, a straight untapered groove will produce a satisfactory rib with no weakening of the pipe wall, but that when extruding at a higher speed and/or extruding larger diameter pipe, unacceptable shear stresses may be set up.

In some cases, the stresses can be prevented by slightly angling the slot, as shown at 19 in FIG. 6. In other cases it will be necessary to both angle the slot and to chamfer the outlet end, as shown at 21 in FIG. 7.

It will be noted that in FIG. 7 the groove has a truncated triangular cross-section with two generally radially extending sides which terminate in an open end. The trailing side of the groove at the open end is flared outwardly in a continuous curve.

Finally, the avoidance of shear stresses during the extrusion of large diameter pipe at high speed may require the use of a helical groove as shown at 23 in FIG. 8. Fortunately, it has been found that while there are many variable factors, as mentioned above, the use of a helical groove does permit some leeway in these factors without creating unacceptable shear stresses. Thus, while lineal pipe and rotational core pin speeds do vary within practical production limits, the choice of a helical configuration for the groove can be based on the average of the production limits.

An extruder is essentially a pump. It has an efficient output range for a given material. An extruder operated at the low range of its efficiency will work with an untapered groove, but when one wants to take advantage of the more efficient range of the machine, a tapered groove and/or chamfer is necessary. For example, an extruder with a capacity for extruding acrylonitrilebutadiene styrene plastic into 6 inch pipe at a rate of between 100 and 400 pounds per hour can extrude 6 inch pipe with three grooves at a rate of up to 100 pounds per hour. By chamfering, curving and angling the grooves, the rate can be increased to 350 pounds per hour.

As previously mentioned, it is possible to produce any number and form of spiral ridges on the inside of the extruded pipe, but, by way of example, it should be noted that for a six inch pipe, three ridges of six inch pitch are used and that for an eight inch pipe, four ridges having the same six pinch pitch are used.

In use, fluid plastic is introduced into the head through conduit 22 and first enters the annular space 24 with a non-rotatable component of the head. From this space the plastic flows into the annular passageway 26, which is defined in part by the rotating core 14. The fluid plastic is forced through the annular passage of the forming head in a linear direction to define the inside and outside wall of a pipe. As noted, the core which forms the inner wall of the passage is formed with a groove 16 adjacent the exit end of the passage, which has a cross-section corresponding to the groove to be produced on the inside wall of the pipe. As the pipe is extruded, the core is rotated by operation of the motor 36, as described above, to form a spiral groove on the inside of the plastic pipe which sets as it leaves the open end of the annular passage of the extrusion head.

What I claim as my invention is:

1. In an extrusion machine for the production of elastomeric material pipe, said machine including an extrusion head having an outer die and a rotatable coaxial core defining between them a tube-shaped passageway having an open end through which elastomeric material is extruded to produce pipe, the improvement which comprises at least one groove in the outside surface of said core, said groove extending substantially linearly with respect to the flow of the material being extruded and having a truncated triangular cross-section with two generally radially extending sides and having an open end at said open end of said passageway, the side of said groove that trails when said core rotates in use being the trailing side of said groove, the trailing side of said groove at said open end being flared outwardly in a continuous curve, and means for rotating said core whereby the extruded pipe produced in said machine has an integral spiral ridge on its inside surface.

2. An extrusion machine as claimed in claim 1, having a plurality of said grooves in said core outside surface.

References Cited

UNITED STATES PATENTS 3,249,668  5/1966  Scragg et al. _____ 18—14 RR
3,496,605  2/1970  Onaka _____ 18—14 RR
3,404,203  10/1968  Donald _____ 18—14 RR X J. SPENCER OVERHOLSER, Examiner N. E. LEHRER, Assistant Examiner U.S. Cl. X.R.

264—312; 425—381